United States Patent [19]

Kimura et al.

[11] 4,318,714

[45] Mar. 9, 1982

[54] FACILITATED SEPARATION OF A SELECT GAS THROUGH AN ION EXCHANGE MEMBRANE

[75] Inventors: Shiro G. Kimura; William J. Ward, III; Stephen L. Matson, all of Schenectady, N.Y.

[73] Assignee: General Electric Company, Schenectady, N.Y.

[21] Appl. No.: 149,764

[22] Filed: May 14, 1980

[51] Int. Cl.³ ............................................. B01D 53/22
[52] U.S. Cl. ........................................... 55/16; 55/158
[58] Field of Search ...................... 55/16, 158; 210/638

[56] References Cited

U.S. PATENT DOCUMENTS

| | | | |
|---|---|---|---|
| 3,342,729 | 9/1967 | Strand | 210/638 |
| 3,396,510 | 8/1968 | Ward et al. | 55/16 |
| 3,503,186 | 3/1970 | Ward | 55/16 |
| 3,723,306 | 3/1973 | Bridgeford | 55/16 X |
| 3,758,603 | 9/1973 | Steigelmann et al. | 55/16 X |
| 3,758,605 | 9/1973 | Hughes et al. | 55/16 X |
| 3,780,496 | 12/1973 | Ward et al. | 55/16 |
| 3,844,735 | 10/1974 | Steigelmann et al. | 55/16 |
| 3,864,418 | 2/1975 | Hughes et al. | 55/16 X |
| 3,865,890 | 2/1975 | Steigelmann et al. | 55/16 |
| 3,944,485 | 3/1976 | Rembaum et al. | 210/638 |
| 3,957,504 | 5/1976 | Ho et al. | 55/16 X |
| 4,014,665 | 3/1977 | Steigelmann | 55/16 |

*Primary Examiner*—Robert H. Spitzer
*Attorney, Agent, or Firm*—Lawrence D. Cutter; James C. Davis, Jr.; Marvin Snyder

[57] ABSTRACT

There is described the selective separation of a gas from a gaseous mixture utilizing a suitable ion-exchange membrane having specific counter-ions electrostatically retained therein, which counter-ions react reversibly with the specific gas molecules to be separated. By this method, the membrane exhibits high selectivity and facilitated transport of the gas across the membrane effecting superior separation of the select gas from the gas mixture.

9 Claims, No Drawings

FACILITATED SEPARATION OF A SELECT GAS THROUGH AN ION EXCHANGE MEMBRANE

BACKGROUND OF THE INVENTION

This invention relates to the separation of a gas from a mixture of gases. More particularly, this invention is concerned with the utilization of ion-exchange membranes containing selected counter-ions which undergo reversible reaction with a particular gas, thus accomplishing facilitated transport of that gas across the membrane.

Heretofore immobilized liquid membranes have been developed and utilized for the separation of a specific gas from a mixture of gases having diverse or similar characteristics.

U.S. Pat. No. 3,396,510, (Ward III and Robb, assigned to the same assignee as the present application and incorporated by reference), discloses the application of the phenomenon of facilitated transport to liquid membranes to substantially increase the separation factor for gases of such a modified liquid membrane. Facilitated transport is made possible by introducing into the immobilized liquid film a large concentration of at least one select, non-volatile specie, which is soluble in the immobilized liquid and is reversibly reactive with the specific gaseous component to be separated from a mixture of gases, the reaction being productive of a soluble non-volatile specie in large concentration. For example Ward III and Robb describe the use of a membrane comprising an aqueous alkali carbonate solution impregnated in the pores of a porous cellulosic membrane to separate $CO_2$ from gaseous mixtures by facilitated transport.

In U.S. Pat. No. 3,758,603, (Steigelmann et al., assigned to Standard Oil Company, Chicago, Ill.), there is disclosed a process utilizing facilitated transport for separating various aliphatically-unsaturated hydrocarbons from mixtures wherein the aliphatically-unsaturated hydrocarbon to be separated is essentially in a gaseous or vapor phase when it comes in contact with a liquid barrier having dissolved therein one or more metal ions which form a complex with the unsaturated hydrocarbon to be separated. The liquid barrier is generally in contact with a semipermeable membrane which is essentially impermeable to the liquid. The film membrane may be a cellulose acetate membrane or may be made of olefin polymers such as polyethylene, polypropylene and the like.

The liquid barrier contains sufficient water and soluble metal ions to form a suitable complex with at least one aliphatically-unsaturated hydrocarbon component of the feed gas subjected to the separation procedure. The metal ions readily form the complex upon contact with the feed gas mixture, and, in addition, the complex is converted back to the metal ion and an aliphatically-unsaturated hydrocarbon component of the complex, under the conditions which exist on the discharge or release side of the liquid barrier. The released aliphatically-unsaturated hydrocarbons exit the discharge side of the liquid barrier and are removed from the vicinity of the barrier and its supporting structure by suitable means such as by a sweep gas or through the effect of vacuum. The unsaturated hydrocarbon-metal complex forms and is decomposed in the complex metal ion-containing liquid barrier, and as a result the material passing through the barrier is more concentrated with respect to at least one aliphatically-unsaturated hydrocarbon present in the feed gas mixture.

A process for the separation of aliphatically-unsaturated hydrocarbons from mixtures by the combined use of liquid barrier permeation and metal complexing techniques is also disclosed in U.S. Pat. No. 3,758,605 (Hughes et al., assigned to Standard Oil Company, Chicago, Ill.). The liquid barrier is contained within a hydrophilic film membrane, and this liquid barrier contains complex-forming metal ions in an aqueous solution. The metal ions may be selected from transition metals, nickel, mercuric, cuprous or other metal ions or mixtures of these metal ions with or without other cations. The separation of ethylene from methane and ethane is of particular interest.

A particular drawback of the immobilized liquid, facilitated transport membranes is the difficulty of maintaining the integrity of the liquid membranes in the presence of a transmembrane pressure difference. Additionally, when a humidity gradient of the feed gas is present, such as when a substantial fraction of the feed gas is transported through the membrane, there is a tendency of the solute species to migrate along the membrane to the region of highest relative humidity. Indeed, if a condition exists where the humidity of the gas exceeds 100%, and condensation occurs, the salt solution may be washed from the liquid membrane.

In order to achieve a physically useful immobilized liquid membrane structure, the liquid is generally held in the pores of a porous hydrophilic polymer membrane. Typically, these porous membranes may be cellulosic or other hydrophilic material. The transmembrane pressure differential which liquid membranes can withstand is dictated by the capillary forces holding the liquid within the pores of the membrane. Ion-exchange membranes, which are highly swollen by water and aqueous solutions can also be used as the liquid immobilizing membrane. Here the transmembrane pressure differential limit is dictated by the "swelling pressure", that is the internal pressure of the ion-exchange membrane containing the liquid, which resists the squeezing of the imbibed liquid from the membrane pores. Another method of immobilizing the liquid is to use a supporting membrane which is impermeable to the membrane liquid. This membrane may be a porous hydrophobic membrane or a non-porous, but highly permeable membrane. Often, this type of membrane is used to support a liquid membrane immobilized in a porous hydrophilic membrane.

Although immobilized liquid membranes have been successfully utilized in the laboratory and pilot plant, the above limitations inherent to these membranes limit their practical applicability.

The invention described in this patent circumvents the problems inherent in immobilized liquid facilitated transport membranes. In this invention, an ion-exchange membrane with an appropriate mobile counter-ion is chosen from that group of ions which will reversibly combine with the gas to be transported. If the membrane is maintained in a humid atmosphere by humidification of gases in contact with the membrane, the counter-ions will be mobile, and facilitated transport will take place. Since electroneutrality within the membrane must be maintained, the carrier counter-ion cannot be lost by physical processes such as the imposition of a high transmembrane pressure gradient. Thus, many of the limitations associated with immobilized liquid ion-exchange membranes are eliminated. In the case of the immobilized liquid facilitated transport membranes, the facilitating specie was physically held within the structure of the membrane primarily by surface tension forces acting indirectly on the solution containing the carrier species. In our invention, the facilitating specie is actually a functional element of the polymer comprising the membrane. In this situation the carrier species is directly localized by electrical forces acting on the carrier specie as opposed to surface tension forces retaining the carrier specie.

U.S. Pat. No. 3,780,496, Ward III et al., (assigned to the same assignee as the present application and incorporated by reference), discloses a method for the separation of helium, hydrogen and oxygen from gas mixtures. The process disclosed in the Ward III et al. patent recognizes that sulfonated polyxylylene oxide is an ion exchange material with the unique property of being solvent castable into a film. When this ion exchange material is placed in an aqueous salt solution, the active groups dissociate and the counter-ion becomes mobile and subject to displacement by other cations which may be present in the salt solution. Thus, films of sulfonated polyxylylene oxide may be readily converted to a number of counter-ion forms.

The sulfonated polyxylylene oxide membrane prepared according to the described method of Ward III et al. exhibits optimized gas separation properties when select counter-ion forms of the sulfonated polyxylylene membranes are employed for the separation of different gases.

However, while the Ward III et al. patent teaches the use of sulfonated polyxylene oxide as an ion exchange material used in a solution-diffusion, that is, a non-reactive membrane, it does not teach the use of a mobile counter-ion or a counter-ion which must react reversibly with one of the components of the gas mixture.

The gas permeation rate of the membrane prepared from sulfonated polyxylylene oxide as disclosed in the Ward III et al. patent is governed by the physical solubility of the gas in the membrane and the diffusion coefficient of the dissolved gas. According to Applicants' process, the various counter-ions disclosed in the present invention are used to vary the chemical interactions between the gas and the membrane. However, the reversible reactivity of the counter-ion as a facilitated transport carrier retained in the membrane as a counter-ion balancing the charge of the fixed ions in the membrane is neither taught nor suggested by the Ward III et al. patent or by any other reference available in the prior art.

SUMMARY OF THE INVENTION

It is the object of the invention to provide an improved process for the selective separation of a gas utilizing an ion-exchange membrane having the appropriate counter-ions which will reversibly react with certain gases, thus exhibiting facilitated transport of these gases.

This object can be accomplished by providing a suitable semi-permeable ion-exchange membrane and attaching a suitable counter-ion to the ion-exchange membrane matrix which reacts reversibly and selectively with the gas to be separated.

DETAILED DESCRIPTION OF THE INVENTION

The method of the present invention is based on the use of a suitable ion-exchange membrane with specific counter-ions to perform facilitated gas transport. In the instance where the carrier species is an anion the immobilizing matrix would be an anion exchange membrane characterized by fixed positively charged functional groups.

The process of preparing specific ion-exchange membranes in different counter-ion forms is accomplished by soaking the membrane in an aqueous solution containing the desired ion. To insure that the membrane is in the desired counter-ion form, the membrane should be placed in an aqueous solution whose volume is on the order of 100 times the membrane volume and whose salt concentration is at least 0.1 molar and preferably greater than 1 molar.

Examples of liquid facilitated transport membranes used in the separation of gases are disclosed in U.S. Pat. No. 3,396,510 (Ward III and Robb, assigned to the same assignee as the present invention and incorporated by reference) and U.S. Pat. No. 3,758,605, (Hughes et al. assigned to the Standard Oil Company, Chicago, Illinois, and incorporated by reference). In the Ward III and Robb patent, facilitated transport is made possible by introducing into the immobilized liquid film a large concentration of at least one selected, nonvolatile specie, which is soluble in the immobilized liquid and is reversibly reactive with the specific gaseous component to be separated from a mixture of gases, the reaction being productive of a soluble non-volatile specie in large concentration.

The Hughes et al. patent discloses the separation of aliphatically unsaturated hydrocarbons from mixtures by facilitating the transport of the unsaturated hydrocarbons across immobilized liquid membranes containing a metal ion in solution which reacts reversibly with the unsaturated hydrocarbon. The facilitating liquid is an aqueous solution containing complex-forming metal ions held in the pores of the porous membrane due to the surface tension of the aqueous solution.

In the present invention, the membrane actively takes part in the facilitation of the gas permeation rather than acting as a liquid holder. The counter-ion, which is mobile within the pores of the ion-exchange membrane, is retained within the membrane surfaces by the requirement of maintaining electroneutrality.

The present invention will be illustrated in greater detail in the following examples. It will be self-evident to those skilled in the art that the ratios, ingredients in the formulations and the order of operation can be modified within the scope of the present invention. Therefore, the present invention is not to be interpreted as being limited to the following examples.

EXAMPLE 1

Carbonate solutions are known to facilitate the transport of carbon dioxide, the net chemical reaction being $CO_2 + CO_3^= + H_2O = 2HCO_3^-$.

An anion-exchange membrane with $CO_3^=/HCO_3^-$ counter-ions has also been shown to exhibit facilitated transport. A quaternized polyxylylene oxide was prepared, and membranes prepared by solvent casting. Carbonate counter-ions were then substituted onto the membrane, which had originally been in the $Br^-$ form as a result of the ion exchange polymer synthesis reaction. Carbonate substitution was easily accomplished by soaking the membrane in a solution of $K_2CO_3$. The membrane was thoroughly rinsed with distilled water to remove any carbonate not functioning as a counter-ion. $CO_2$ permeation properties were then measured by passing a humidified CO₂/oxygen mixture over one surface of the membrane, and countercurrently flowing a helium sweep gas stream over the other surface. The results of this test are shown below; and the permeabilities compared with those for a water film and the base polyxylylene oxide polymer.

PERMEABILITY OF QUATERNIZED POLYXYLYLENE
OXIDE WITH $CO_3^=/HCO_3^-$ COUNTER ION
$CO_2$ Partial Pressure in Feed = 3.8 cmHg
T = 25° C.

| | Permeability, $\frac{cc(STP)}{cm^2 sec} \cdot \frac{cm\ thick}{cmHg\ P} \cdot 10^9$ | |
|---|---|---|
| | $CO_2$ | $O_2$ |
| WATER | 40 | 2 |
| POLYXYLYLENE OXIDE POLYMER | 8.4 | 1.7 |
| QUATERNIZED POLYXYLYLENE OXIDE | 105 | 1.6 |
| QUATERNIZED POLYXYLYLENE OXIDE | 117 | 8.6 |

It can be clearly seen that substantially improved $CO_2$ permeability has been achieved with the anion-exchange membrane, and that very high selectivity for $CO_2$ over the non-reacting $O_2$ has been accomplished, thus indicating that facilitated $CO_2$ transport indeed occurs.

EXAMPLE 2

To illustrate the separation of carbon dioxide from a gas containing same, a strong basic anion-exchange membrane composed of quaternized poly(vinylpyridine) grafted to a poly(tetrafluoroethylene) backbone having an exchange capacity of 2.6 meq/g, a gel water content of 39%, and a thickness of 110 μm (type R-4025, RAI Research Corp., Hauppage, Long Island, N.Y.) was converted to either the $CO_3^=$ or $Cl^-$ form by soaking the membrane in an aqueous $K_2CO_3$ or KCl, respectively. The $CO_2$ permeability of the membrane in the $CO_3^=$ form ($22 \times 10^{-9}$) was twice that of the control membrane in the $Cl^-$ form ($11 \times 10^{-9}$), providing evidence that facilitation did occur.

Better performance was observed when the amino acid glycine was used as the carrier; it, like all primary amines, reacts reversibly with $CO_2$ to form a carbamate. The anion-exchange membrane described above had the glycine anion introduced by soaking it in an aqueous solution of the amino acid adjusted to pH 12 where the glycine carboxylic acid was ionized but the amine function was not. Its $CO_2$ permeability at 25° C. was $80 \times 10^{-9}$, corresponding to a facilitation factor of about seven. The term "facilitation factor" should be understood to mean that ratio of the permeability in the reactive facilitated transport system divided by the permeability in the non-reactive system or membrane not containing the reactive component.

EXAMPLE 3

A cationic carrier membrane was prepared utilizing the singularly protonated, monopositive cation of ethylenediamine (EDA), whose unprotonated amine group reacts reversibly with $CO_2$ to form a carbamate, the overall reaction being $CO_2 + 2(H_3^+N—C_2H_4—NH_2) = (^+H_3N—C_2H_4—NHCOO^-) + (^+H_3N—C_2H_4—NH_3^+)$.

The membrane was a strong acid cationic exchanger composed of sulfonated polystyrene grafted to a poly(tetrafluoroethylene) matrix, having a capacity of 5 meq/g, a gel water content of 11%, and a thickness of 110 μm (R-4010, RAI Research Corp.). The membrane was soaked in aqueous EDA solution (25 wt.%) adjusted with HCl to pH 11, in order to introduce EDA primarily as the monopositive cation ($pK_1 = 6.85$, $pK_2 = 9.93$) and rinsed thoroughly with distilled water to remove neutral EDA.

The facilitation effect, i.e. the increase in $CO_2$ permeability with EDA present is evidenced by the $CO_2$ facilitation factor at 22 mm Hg of $CO_2$ of about 20. The $CO_2$ permeability of the membrane in the EDA form was $550 \times 10^{-9}$ while that of a control membrane in the $Na^+$ cation form was $30 \times 10^{-9}$. The $N_2$ permeability at 22° C. was $1 \times 10^{-9}$ so that the selectivity for $CO_2/N_2$ was approximately 600:1 at 22 mm $HgCO_2$.

EXAMPLE 4

In a preferred embodiment for separating olefins from a gas mixture, a sulfonated polyxylylene oxide ion-exchange membrane was prepared from a casting solution consisting of 10 percent by weight solids in a solvent mixture of 2 parts by weight chloroform and 1 part by weight methanol yielding the hydrogen ion form of sulfonated polyxylylene oxide having a membrane thickness of approximately 1 mil. To facilitate the transport of olefins in a reversible reaction with silver ions, the membrane was converted to a silver counter-ion form by immersing the membrane in 1.3 M $AgNO_3$ solution for 8 hours. Thereafter, the membrane was rinsed in distilled water to remove any $AgNO_3$ solution or $Ag^+$ ions not electrostatically associated with the sulfonate groups on the membrane polymer. The membrane was blotted dry and placed in a permeation cell which provided for a flow of gas on either side of the membrane. The membrane thus prepared was used to determine the membrane permeability to hydrocarbons, and more specifically its applicability to the ethylene/ethane separation. Gases fed to the membrane were humidified to 90 percent relative humidity. The feed gases were pure ethylene or pure ethane and the sweep gas on the low pressure side of the membrane was helium. To determine the membrane permeability to the hydrocarbons, the sweep gas flow rate was determined, and the concentration of hydrocarbon in the gas was measured with a gas chromatograph. It was determined that ethylene permeability at 25° C. was $$230 \times 10^{-9} \frac{cc, cm}{sec, cm^2}, cm\ Hg\Delta p.$$

The permeability of ethane under corresponding conditions is only $$0.8 \times 10^{-9} \frac{cc, cm}{sec, cm^2}, cm\ Hg\Delta p.$$

The ethylene/ethane separation factor was approximately 300, verifying that the ethylene transport was facilitated by the reversible reaction with the mobile silver ($Ag^+$) counter-ions of the ion exchange membrane.

What we claim as new and desire to secure by Letters Patent of the United States is:

1. A method for the selective separation of a gas from a mixture of gases which comprises
   (a) providing a semi-permeable ion-exchange membrane having counter-ions electrostatically contained therein as part of said membrane, said counter-ions reversibly reacting with select gas molecules contained within a gaseous mixture, and
   (b) contacting a first side of the semipermeable membrane with a mixture containing said gas, and (c) providing a means for removing the permeating gas from the opposite side of the membrane, thereby providing a transmembrane partial pressure gradient of the gases to be separated, and, in particular, the permeating gas.

2. The method of claim 1 wherein the membrane is a cation exchange membrane.

3. The method of claim 1 in which the membrane is an anion-exchange membrane.

4. The method of claim 1 in which the counter-ion is silver or other transition metal ion.

5. The method of claim 1 in which said counter ions are from the group consisting of $CO_3^=/HCO_3^-$, glycine, or other anion which reacts reversibly with $CO_2$ or $H_2S$.

6. The method of claim 1 in which said counter ions have a free primary amine function which reacts reversibly and selectively to facilitate $CO_2$ or $H_2S$ transport across the membrane.

7. The method of claim 6 in which the cationic amine is the monoprotonated cationic amine of ethylene diamine.

8. The method of claim 1, in which the membrane selectively separates olefins from a gas mixture.

9. The method of claim 1 in which the membrane selectively separates acid gases from a gas mixture.

* * * * *